United States Patent [19]

Patel et al.

[11] 4,434,382

[45] Feb. 28, 1984

[54] VISCOELASTIC SUPPORT FOR DYNAMOELECTRIC MACHINES

[75] Inventors: Mukunk R. Patel, Monroeville; Richard D. Nathenson, Pittsburgh, both of Pa.

[73] Assignee: Electric Power Research Institute, Inc., Palo Alto, Calif.

[21] Appl. No.: 340,433

[22] Filed: Jan. 18, 1982

[51] Int. Cl.³ .............................................. H02K 5/24
[52] U.S. Cl. .......................................... 310/51; 74/574; 188/378; 248/638
[58] Field of Search .................... 310/51, 42, 157, 258, 310/194; 336/100; 188/297, 322.5, 378, 379; 74/574; 248/562, 636, 638

[56] References Cited

U.S. PATENT DOCUMENTS

| | | | |
|---|---|---|---|
| 2,514,140 | 7/1950 | O'Connor | 188/379 |
| 4,005,858 | 2/1977 | Lochner | 188/268 |
| 4,145,626 | 3/1979 | Aroshidze | 310/51 |
| 4,151,433 | 4/1979 | Flick | 310/54 |
| 4,173,724 | 11/1979 | von Musil | 310/51 |
| 4,217,510 | 8/1980 | Detinko | 310/51 |
| 4,292,558 | 9/1981 | Flick | 310/254 |

FOREIGN PATENT DOCUMENTS

| | | | |
|---|---|---|---|
| 610865 | 12/1960 | Canada | 310/51 |
| 660085 | 5/1938 | Fed. Rep. of Germany | 310/51 |
| 1117651 | 6/1968 | United Kingdom | 310/51 |
| 322825 | 11/1971 | U.S.S.R. | 310/51 |
| 637918 | 12/1978 | U.S.S.R. | 310/51 |

OTHER PUBLICATIONS

Dynamic Response of Power Transformers, (pp. 1-3, 1567-1575) R. Patel, G.E. Co. Pittsfield, Mass., 12/72.
Dynamic Stiffness & Damping, (pp. 2-8), D. O. Swihart & D. V. Wright, Westinghouse R.L.'s, 4/75.

*Primary Examiner*—R. Skudy
*Attorney, Agent, or Firm*—William D. Lanyi

[57] ABSTRACT

A viscoelastic support system is disclosed which utilizes an oil impregnated porous material. The porous bar has mechanical properties which behave in significantly different manners under sudden long duration loads. It withstands sudden forces with little deflection but deflects significantly in response to slowly applied forces. These dual characteristics avoid the harmful effects of additive stresses which could otherwise result from sudden loads caused by transient faults which occur following thermal expansion which has produced built up stresses following normal operation.

5 Claims, 3 Drawing Figures

VISCOELASTIC SUPPORT FOR DYNAMOELECTRIC MACHINES

BACKGROUND AND SUMMARY OF THE INVENTION

The development of superconducting electrical generators has led to the use of airgap armature windings. These airgap armature windings are distinguishable from conventional stator windings by their structure which includes a support mechanism which does not include insertion in a slotted core. Conventional stators employ a generally rigid cylindrical core which is constructed from a plurality of stacked laminations. Each lamination has a plurality of teeth which, when stacked together, result in axial grooves in the inner cylindrical periphery of the core. By inserting the stator windings within these grooves, support is provided for the stator coils.

In contradistinction to the above described conventionally constructed stator, superconducting generator stators support the stator winding in generally rigid nonconductive material which is typically cylindrically shaped and which encase the conductive stator coils. This material typically has less mechanical strength than that provided by the laminated core and, therefore, the stresses to which the coils are subjected must be held to values within this lesser strength.

There are two major sources of mechanical stress in a superconducting generator stator, one due to thermal expansion and another caused by electromagnetic forces which occur during transient faults. When a transient fault occurs following a sustained operation which has produced thermal expansion of the stator components, the total stresses on the stator structure could be approximately equivalent to the sum of these two conditions and could approach or exceed the strength of the materials used to support the airgap armature winding.

Since the materials which are presently used in the support structure of airgap armature windings are of limited strength, a means for minimizing the stresses on them is required. The present invention provides a way of avoiding the additive stresses, particularly their radial components, resulting from both the thermal expansion and transient fault forces described above.

A generator stator made in accordance with the present invention incorporates an outer support structure around the airgap armature structure. Both are generally cylindrical and are associated in a coaxial and concentric assembly. A gap, or interface space, is provided between these two members which is generally cylindrical. Grooves are shaped in both the inner surface of the outer support structure and the outer surface of the airgap armature structure. These grooves are aligned to form a channel which is intersected by the above mentioned interface gap.

Within the channel, an interface support structure is disposed. It consists of a porous bar which is impregnated with a liquid, such as transformer oil, and encapsulated by an impermeable covering, such as plastic. Although a single interface support structure is described herein, it should be understood that a plurality of interface structures may be used, each being disposed in a separate channel.

The porous bar, which can be a fiber composite, is deformable under a sustained force but provides a rigid support capable of withstanding sudden forces of short duration, such as those caused by transient faults. The bar's ability to withstand short duration impulses enables the support system to provide stiffness which resists sudden deflections whereas the bar's gradual deformation under long duration forces, such as those caused by thermal expansion, enables it to avoid built up stresses caused by this expansion.

Since transient faults in an electrical generator typically produce forces which are tangential to the stator coil structure, the present invention is most advantageously positioned to extend axially along the interface gap. However, it should be understood that the porous bar of the present invention can be configured in any direction which extends perpendicular to the direction of anticipated forces.

BRIEF DESCRIPTION OF THE DRAWING

The present invention will be more completely understood from a reading of the description of the preferred embodiment in conjunction with the figures, in which.

DESCRIPTION OF THE PREFERRED EMBODIMENT

The present invention relates generally to a support structure of electrical generators and, specifically, to viscoelastic means for providing support to an airgap armature of a superconducting generator.

Figure 1:
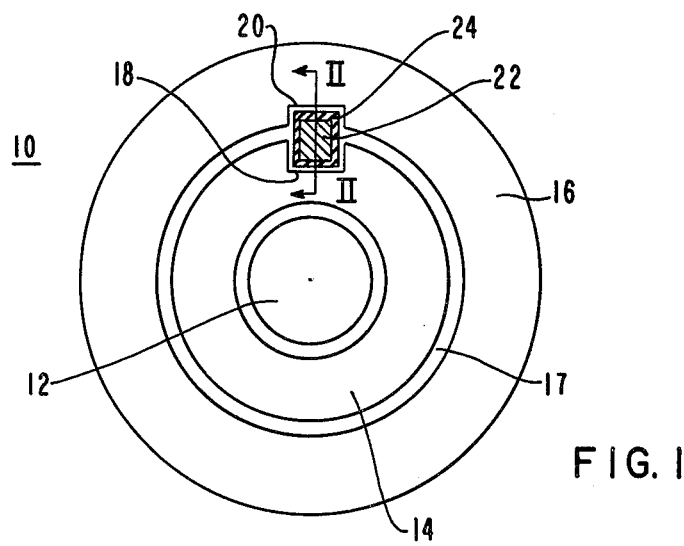
FIG. 1 is a schematic end view of an exemplary superconducting generator employing the present invention.

FIG. 1 depicts an end view of a superconducting generator 10. The rotor member 12 is supported at its ends (not shown in FIG. 1) in a manner which maintains its concentricity with the airgap armature 14. The airgap armature 14 shown in FIG. 1 represents a generally rigid nonconductive material which is disposed around a generally cylindrical stator coil structure (not visible in FIG. 1).

The stator coil structure of a superconducting generator is typically an interleaved pancake assembly as shown and described in U.S. Pat. No. 4,151,433 issued to Flick on Apr. 24, 1979 and U.S. Pat. No. 4,292,558 issued to Flick, et al. on Sept. 29, 1981. The coil assembly is encased in a generally rigid non-conductive structure which provides it with both electrical insulation and mechanical support. Structures of this type are shown and described in copending patent applications Ser. No. 324,295 filed on Nov. 15, 1981 and Ser. No. 226,335 filed on Jan. 19, 1981, both of which are assigned to the assignee of the present application.

The airgap armature structure 14 is disposed in concentric and coaxial relation with an outer structure 16 with an interface space 17, or gap, therebetween. The outer cylindrical surface of the airgap armature structure 14 is provided with a groove 18 which, in the preferred embodiment, runs axially along the armature's periphery. A similar groove 20 is provided in the inner cylindrical surface of the outer structure 16. When tangentially aligned, as shown in FIG. 1, these two grooves, 18 and 20, cooperate to form a channel which runs axially between the outer structure 16 and airgap armature structure 14, intersecting the interface space 17.

The grooves, 18 and 20, are configured to form the channel which is shaped to receive a porous bar 22 which is disposed therein. The bar 22 is impregnated with a fluid, such as transformer oil, which fills the bar's internal voids. The oil impregnated porous bar 22 is enclosed in an impermeable covering 24 which can be an elastomer, such as plastic. The covering must be nonrigid and capable of containing the above mentioned bar 22 and oil. Although only one interface support structure is shown in FIG. 1, it should be understood that a plurality of them can be spaced around the airgap armature structure 14 in the interface space 17.

Although many porous materials can be used to manufacture the porous bar 22, oil permeable transformer board is advantageous because of its easy availability and known characteristics. The calculated and empirical values of its viscoelastic stiffness is reported in "Dynamic Response of Power Transformer Windings and Clamps under Axial Short Circuit Forces", Ph.D. Thesis by M. R. Patel, Rensselear Polytechnic Institute, June, 1972, in pages 1567 to 1576 of "Dynamic Response of Power Transformers under Axial Short Circuit Forces", by M. R. Patel, IEEE Transactions on Power Apparatus and Systems, Volume PAS-92, 1973 and in pages 721 to 730 of "Dynamic Stiffness and Damping of Transformer Pressboard during Axial Short Circuit Vibrations", by D. O. Swihart and D. V. Wright, IEEE Transactions, Volume PAS-95, 1976. Patel, in the 1972 and 1973 documents described above, shows that the compressive modules of oil impregnated pressboard under suddenly applied power frequency loads is approximately seven times its modulus under gradually applied loads, whereas the Swihart and Wright document gives the viscoelastic properties of oil permeated transformer boards at various preloads and temperatures. It should be understood, however, that any other suitable material, such as fiber composite, could be used within the scope of the present invention.

The porous bar 22 serves the function of permitting deflections caused by slowly applied forces such as thermal expansion, thus avoiding the build up of stresses during normal operation. It also has the characteristic of withstanding deflections caused by sudden forces such as those caused by transient fault conditions. These dual functions prevent the additive effect of transient forces combined with thermally induced forces which could otherwise exceed the mechanical strength of the nonconductive materials used in the construction of the airgap armature structure 14 which is significantly less than that of the laminated core which is typically used in conventional, nonsuperconducting electrical generators as described above.

Figure 2:
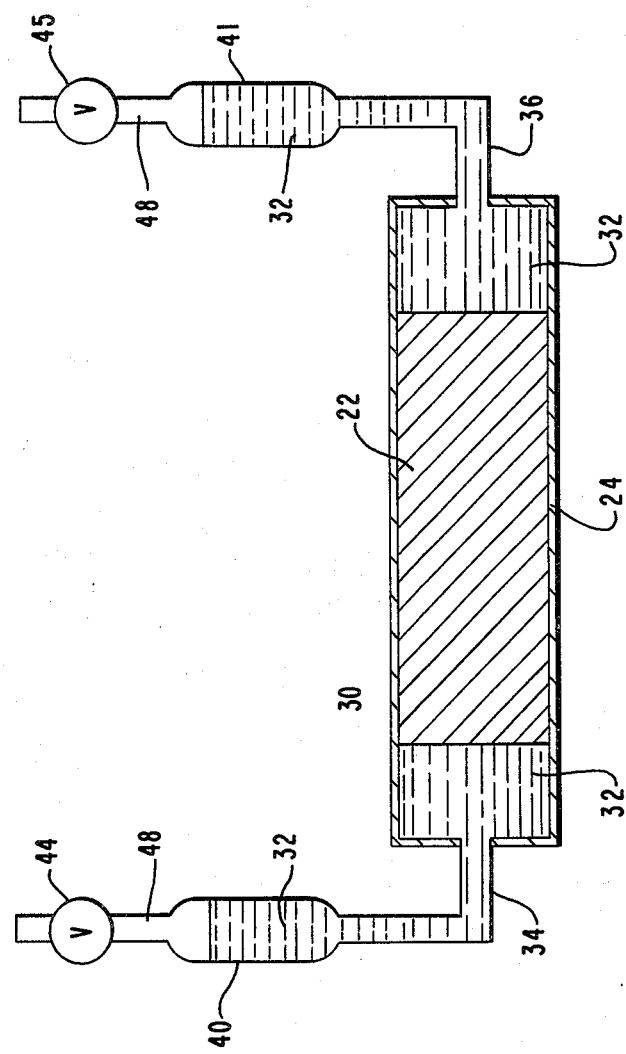
FIG. 2 is a more detailed sectional view of the present invention shown in FIG. 1.

FIG. 2 is a longitudinal sectional view of the interface support device 30 which comprises the porous bar 22 and impermeable covering 24 shown in FIG. 1. In FIG. 2, the bar 22 is accompanied with a reservoir of oil 32 disposed around it within the covering 24. Conduits 34 and 36 are provided to permit a flow of oil 32 into and out from the impermeable covering 24.

When the dynamoelectric machine is initially started, its temperature gradually rises and its stator components expand. This causes the porous bar 22 of the interface support device 30 to be compressed slowly, squeezing some oil from its multiplicity of internal voids. The oil 32 flows axially toward the ends of the impermeable covering 24 and through the conduits 34 and 36 into the reservoir bottles 40 and 41.

If valves 44 and 45 are closed, this oil flow compresses and raises the pressure of the gas 48 which is located in the space above the oil 32 in the bottles 40 and 41. As the machine cools, this pressure forces the oil 32 back into the voids of the porous bar 22.

Depending on the specific requirements of the generator, the present invention can comprise the valves 44 and 45 or, alternatively be open to atmospheric pressure. Furthermore, the pressure of the gas 48 can be raised by an external pressure system or left at atmospheric pressure before startup and sealed to permit the oil flow to raise the gas pressure during operation.

It is important to understand that, regardless of the specific construction of the interface support device 30, it must be able to withstand sudden loads and also to permit deflection under slowly applied loads. This dual function releaves stresses which could otherwise build up in the stator structure due to thermal expansion, while also resisting possibly damaging deflections which can be caused by sudden transient faults.

Figure 3:
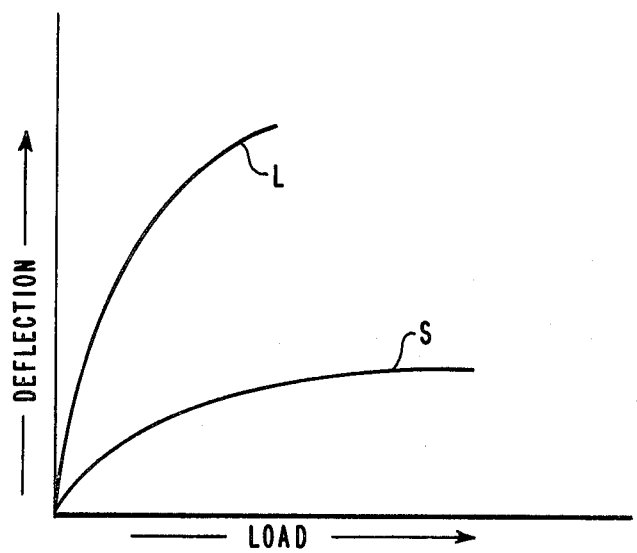
FIG. 3 is a graph of the deflection/load relationship of the present invention under both sudden and long duration forces.

These characteristics are illustrated in FIG. 3. The dual behavior of oil impregnated porous material, such as transformer board, is shown by the two curves, S and L. Curve S represents the device's behavior under short duration forces such as those caused by transient faults. As can be seen in FIG. 3, very high loads produce only slight deflections due to the material's high modulus in response to sudden forces. However, under long duration loads as depicted by curve L, the porous material deflects considerably more due to its lower modulus under these conditions. Typical long duration loads are those caused by thermal expansion of stator components.

It should be apparent that the present invention provides a support system capable of withstanding sudden forces without allowing significant deflections but, under slowly applied loads, deflect in a manner which reduces built up stresses. It should further be apparent that these characteristics prevent the deleterious additive effect of sudden forces caused by transient faults which occur after long duration thermal expansion has occurred during the normal operation of an electrical generator. Furthermore, it should be understood that, although the present invention has been described in considerable detail and specificity, other embodiments are within its scope.

What we claim is:

1. A dynamoelectric machine, comprising:
   a cylindrical rotor member;
   a generally cylindrical association of stator coils disposed within a generally cylindrical coil support structure, said coil support structure being generally cylindrical with a central bore therethrough, said coil support structure being disposed in concentric and coaxial relation around said rotor member;
   an outer structure having a central cylindrical bore therethrough, said outer structure being disposed around said coil support structure in concentric and coaxial relation therewith, said outer structure having an inner diameter surface shaped to receive said coil support structure with a generally cylindrical gap therebetween;
   said inner diametric surface having a first channel shaped to receive a preselected portion of an interface assembly;

said coil support structure having an outer diametric surface which has a second channel shaped to receive a preselected portion of said interface assembly; and said interface assembly having a porous member impregnated with a liquid, said porous member being disposed within a generally flexible impermeable covering, a preselected portion of said interface assembly being disposed in said first channel and a preselected portion of said interface assembly being disposed in said second channel.

2. The dynamoelectric machine of claim 1, wherein: said liquid is oil.

3. The dynamoelectric machine of claim 1, further comprising:
   means for maintaining said liquid at a pressure which is higher than ambient pressure.

4. The dynamoelectric machine of claim 1, wherein: said porous member is made of a fiber composite material.

5. The dynamoelectric machine of claim 2, wherein: said oil is transformed oil.

* * * * *